United States Patent [19]

Rabian

[11] Patent Number: 4,772,368
[45] Date of Patent: Sep. 20, 1988

[54] PROCESS FOR SPARK EROSION OR ELECTROCHEMICAL MACHINING OF TAPERED GEARS OF HYPOID TOOTH PROFILE OR SIMILAR PARTS

[75] Inventor: Laszlo Rabian, Crissier, Switzerland

[73] Assignee: Werkzeugmaschinenfabrik Oerlikon Buhrle AG, Zurich, Switzerland

[21] Appl. No.: 46,885
[22] PCT Filed: Aug. 8, 1986
[86] PCT No.: PCT/CH86/00113
  § 371 Date: Apr. 2, 1987
  § 102(e) Date: Apr. 2, 1987
[87] PCT Pub. No.: WO87/00782
  PCT Pub. Date: Feb. 12, 1987

[30] Foreign Application Priority Data

Aug. 8, 1985 [CH] Switzerland .................. 3386/85

[51] Int. Cl.$^4$ .................. B23H 7/18; B23H 7/20
[52] U.S. Cl. .................. 204/129.43; 204/129.5; 204/129.55; 204/129.7; 204/224 M; 204/225; 204/DIG. 9; 204/228; 204/212; 219/69 V
[58] Field of Search .......... 204/129.5, 129.55, 129.43, 204/224 M, 225, 228, DIG. 9, 212, 129.7; 219/69 M, 69 V, 69 RS, 69 P

[56] References Cited

U.S. PATENT DOCUMENTS

| | | | |
|---|---|---|---|
| 3,288,699 | 11/1966 | Trager et al. | 219/69 M X |
| 3,499,830 | 3/1970 | Haggerty et al. | 204/224 M |
| 3,530,271 | 9/1970 | Ullmann et al. | 204/129.5 X |
| 3,553,095 | 1/1971 | Daniel | 204/224 M X |
| 4,097,710 | 6/1978 | Maillet | 204/129.43 X |
| 4,264,417 | 4/1981 | Vasiliev et al. | 204/129.43 |
| 4,350,865 | 9/1982 | Bachrach | 219/69 M |
| 4,672,161 | 6/1987 | Inoue | 204/129.43 X |

Primary Examiner—Donald R. Valentine
Attorney, Agent, or Firm—Herbert Dubno

[57] ABSTRACT

A process is described whereby a workpiece is immersed in an electrode, any interlocking between the workpiece and electrode and/or damage to flanks of the workpiece is avoided, and the desired accuracy and surface condition are obtained, by turning negative flanks of a tooth through an angle $\gamma$ in relation to a center of the negative tooth space. A first, a second, a third and even a fourth movement may be combined with the aforementioned steps such that there is constant adaptation of the parameters of a machining generator depending on a remaining path to be covered.

4 Claims, 4 Drawing Sheets

PROCESS FOR SPARK EROSION OR ELECTROCHEMICAL MACHINING OF TAPERED GEARS OF HYPOID TOOTH PROFILE OR SIMILAR PARTS

FIELD OF THE INVENTION

The invention refers to a process for spark erosion or electro-chemical machining, in particular of tapered or bevel gears of hypoid tooth profile out of one piece, whereby the workpiece to be machined is immersed into an electrode of a machine operating on the spark erosion or electrochemical principle by means of a movement that is helicoidal relative to the electrode, said electrode having the negative shape of the workpiece.

BACKGROUND OF THE INVENTION

Tapered or bevel gears of hypoid tooth profile are primarily used in gears for automotive vehicles and helicopters. They are prepared from high-alloy steels in a soft state on special gear cutting machines having profiled cutting tools, and the cutting is carried out by the rolling or hobbing method. Afterwards the gears are hardened.

Due to the inavoidable hardening distortions they loose their original accuracy. In order to make them suitable again for their use in vehicle gears, they are lapped in pairs on special lapping machines. During lapping also the most favorable mounting position for each wheel pair is determined. During mounting of the gear the mounting of the wheel pairs must be adjusted to this present position by means of calibrated washers and/or particular bearing bushes.

One would prefer to avoid this labor-intense handling and also desire to have higher accuracies as well as surfaces of "grinding quality". Unfortunately bevel gears of hypoid tooth profile have a very complex tooth geometry. The flank lines in the rolling plane may be spirals, cycloids, hypoids, circular arcs or involutes. The narrow curvatures of the teeth and the narrow tooth gaps permit only the use of grinding tools of the size approximately of a pencil tip or, exceptionally, also thin-walled cup wheels. These grinding tools exclude already the possibility of grinding economically precut or preforged bevel gears having dimensions that are increasd by the so-called grinding allowance.

From tool making it's known to machine complex three-dimensional workpieces by means of spark erosion and/or by the electrochemical method. as generally known, the subsequent hardening and therefore the undesired hardening distortions are avoided. The most recent state of the art on spark erosion is described in leaflet EDM 3374, Robofil/Roboform, of Charmilles Technologies S.A., 109 rue de Lyon, Geneva (Switzerland), dated May 1984. On pages 12 and 13 the possible working forms of the immersion erroding machine are represented and briefly described.

For machining bevel gears of hypoid tooth profile by means of spark erosion, the "spiral-shaped machining of threads and spiral-shaped recesses" comes closest to it. On this kind of machining the workpiece is immersed, with a relative helical or screwmotion between it and the electrode, into the later which has the negative shape of the workpiece. With this kind only such workpieces can be machined which correspond to the following conditions:

no contact must occur during immersion, and
one must never fall below, along the entire spiral arc, before the tecnhologically necessary working gap width.

With this kind of mahcining a cylindrical or tapered thread e.g. can be made only if the thread pitch is constant. If the thread pitch varies more along the entire spiral than does the technologically necessary width of the working gap between the electrode and the workpiece, interlocking occurs during immersion of the workpiece into the electrode. If the thread pitch along the entire thread spiral varies as little as the technologically necessary working gap width, the thread will be partially damaged during immersion of the workpiece into the electrode. It is to be noted that in all three cases the workpiece and the electrode are equidistant in their final position.

Gear wheels of hypoid tooth profile are complex three-dimensional bodies. The pitch of the teeth, the tooth width and the flank normals vary along the tooth width according to higher orders. Therefore they will be briefly described in a practical manner with the pitch angle $\delta$, with the cone distance R, with the tooth width b, the segment angle in function of the tooth width $\beta = F(b)$, the module m and with the normal pressure angle a.

The additional data and characteristics of the bevel gears will be determined by the generating machines. The required vibration and noise tolerances call for maintaining the geometrical accuracies within the range of a few thousands of a millimeter.

The machining of bevel gears of hypoid tooth profile by immersion into the electrode which has the negative shape of the gear wheel is not possible although the electrode would be equidistant to the bevel gear in its final position. Depending upon the variation of the above mentioned parameter of the bevel gear of hypoid tooth profile, the tooth flanks, during insertion of the workpiece into the electrode, will more or less become partially damaged along the tooth width, and in more unfavorable cases even interlocking occurs.

Also it is not possible and could, in addition, not be economical to use an electrode of regularly widened working gap and planetary movements of known manner, firstly due to the very close variation of the surface normal and secondly due to the concentration of the erosion front onto a very small area. The invention tends to overcome these deficiencies.

SUMMARY OF THE INVENTION

The invention solves problem of creating a process for machining tapered or bevel gears of hypoid tooth profile or similar parts by spark erosion and/or electrochemical machining in providing an electrode that is shaped such that the negative tooth flanks are turned towards the center of the negative tooth gaps with so large an angle that, whilst the workpiece is immersed with a first helical movement into the electrode according to the pitch curve of the tooth, at least such large a gap is generated between the electrode and the tooth flanks along the entire tooth that no material removal occurs on the tooth flanks. In this way the teeth are only pre-machined; contact and/or flank damages no longer take place, and afterwards the tooth flanks are finish-machined with a second counterclockwise movement and with a third clockwise movement, separated according to the movement just occurring, and during the movements the parameters of the machining generator are constantly adjusted in dependency of the remaining path to be covered in order to obtain the desired surface without microstructural changes.

The advantages achieved by the invention reside substantially in the fact that the electrode with the turned negative tooth flanks, in co-operation with the three relative movements between workpiece and electrode and with the constant adjustment of the parameters of the machining generator depending on the remaining path to be covered, permits a more economical alternate fine machining of bevel gears of hypoid tooth profile when compared with grinding.

In particular the machining of bevel gears that are cut or forged with a grinding allowance and afterwards hardened can be carried out more economically than by grinding in the desired accuracy.

The process according to the invention, however, also permits the manufacturing of bevel gears of hypoid tooth profile from hard metals and other hard-to-machine materials. Also the inventive process permits the manufacturing of negative forms of bevel gears with hypoid tooth profile which are used as highly accurate forging and die casting tools as well as electrodes.

BRIEF DESCRIPTION OF THE DRAWING

The invention will be explained more in detail in the follwoing with reference to the attached drawings that represent only one embodiment.

In FIGS. 2 and 3 an electrode 1 is illustrated which is adapted to machine a workpiece 2 of FIG. 1 with the aid of relative movements between electrode and workpiece. The electrode and the workpiece are disposed e.g. on a spark erosion or electrochemical machine.

Figure 1:
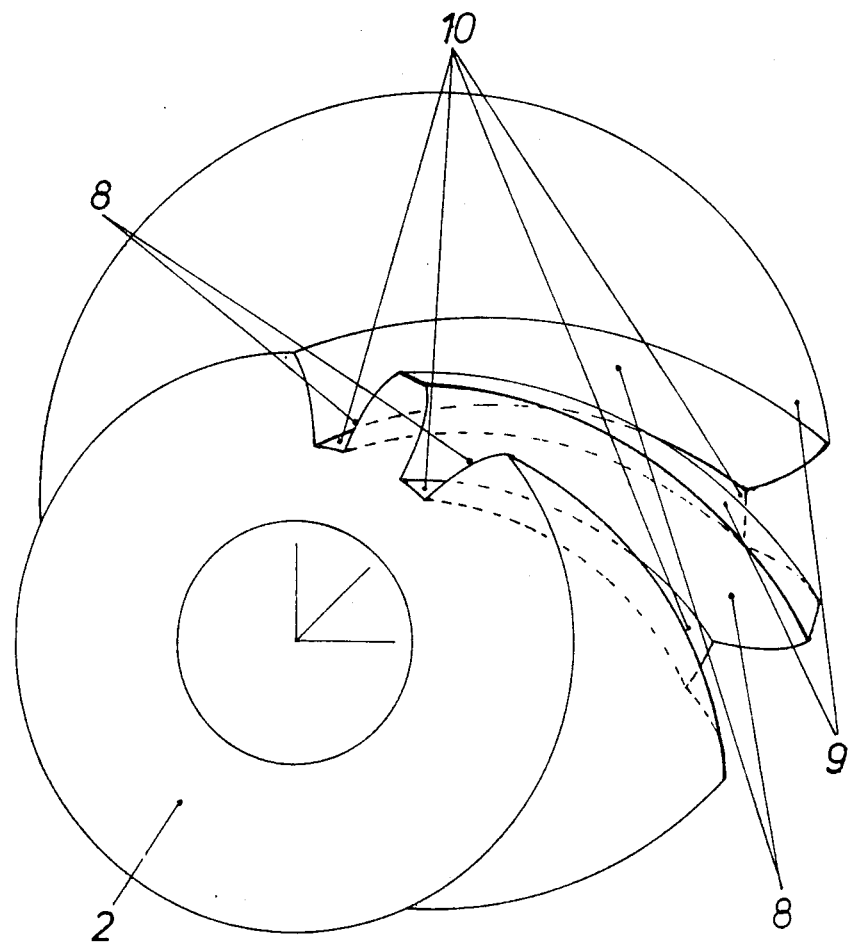
FIG. 1 represents in perspective view a typical workpiece namely a pinion of hypoid tooth profile on which, for better viewing only one tooth and the two adjoining tooth flanks are machined.

According to the invention, electrode 1 is shaped in such a way that its negative tooth flanks 3 are turned towards the center 4 of the negative tooth gaps 5 with a large angle $\gamma$. Angle $\gamma$ is selected such that, whilst workpiece 2 is immersed into electrode 1 with a first helical movement according to the pitch curve of the segment, a distance or gap 6 is created between the turned negative tooth flanks 7 and the tooth flanks 8 on the entire segment. This gap is of such a size that on tooth flanks 8 no more material removal can take place. In this way tooth 9 are only premachined. Contact or flank damage cannot occur anymore. Afterwards tooth flanks 8 will be finish-machined with a second rotational clockwise movement and with a third rotational counterclockwise movement, these movements being separated in time according to the sense of rotation.

During these movements the parameters of the machining generator such as ignition voltage, pulse wave shape, pulsed current, intermission, average current, operational voltage, flushing pressure and flushing quantity are constantly adapted in dependency of the remaining path to be covered, so as to obtain the desired surface without microstructural changes.

According to the inventin electrode 1 may also carry out the following alternate machining. With the first helical movement workpiece 2 is immersed into electrode 1 to such a depth only for which the gap at tooth tip 9 and at tooth base 10 is diminished to such an extent that material removal under rough working conditions would also begin at these locations.

This depth is called the neutral position because in it neither tooth flanks 8 nor tooth base 10 or tooth tip can be damaged under the machining conditions just mentioned.

Afterwards tooth flanks 8, separated according to the rotational movement, will be machined clockwise from this neutral position in a second course that may be composed at will of helical and rotational movements. With a third course workpiece 2 brought back to the neutral position and is finish-machined counterclockwise in a fourth course.

The sequence of machining in the clockwise and counterclockwise sense may also be exchanged, whereby the parameters of the machining generator must be constantly adapted in dependency of the remaining path to be covered, in order to obtain the desired surface without microstructural changes.

In order to achieve shorter machining periods according to the invention, electrode 1 is preferably composed of a multitude of parts which are electrically isolated against each other. Each electrode part is connected electrically by its own cable with the spark erosion or electrochemical generator. In this way a multichannel machining with substantially reduced machining periods will be possible.

When machining bevel gears with hypoid tooth profile out of the full piece or with too great a material allowance, the use of several electrodes 1 according to the invention may be preferred, in order to machine a workpiece with high accuracy. These electrdodes may have the same or different spatial demensions.

Figure 4:
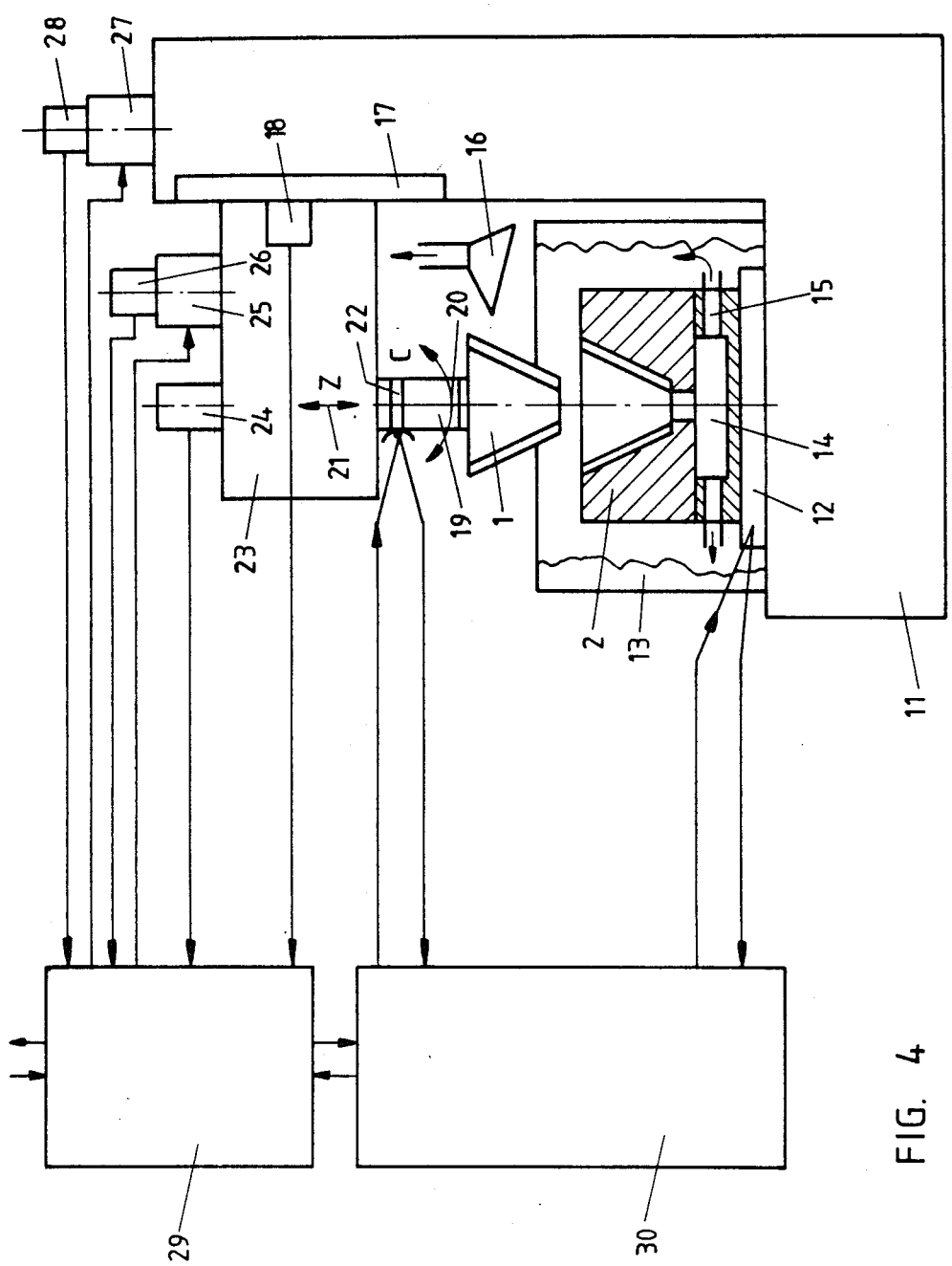
FIG. 4 illustrates a spark erosion machine for machining the workpieces according to FIG. 1 by means of an electrode corresponding to FIGS. 2 and 3.

FIG. 4 illustrates a spark erosion machine which workpiece 2 of FIG. 1 is machined with. The workpiece may also be manufactured with an electrochemical machine. According to FIG. 4 a container 13 for the dielectric is fastened onto a machine bed 12, and electrode 1 is connected with this container. Container 13 is shown in section for better viewing. Electrode 1 is submerged in the dielectric liquid. In order to improve the rinsing conditions during the spark erosion machining, electrode 1 is placed onto a suction pot 14 which sucks the dielectric through the working gap that separates electrode 1 from workpiece 2 during machining and is indispensable for spark erosion machining. The dielectric liquid is conveyed through suction openings 15 and through non-illustrated conduits to a pump, also not represented, and after its cleaning is pumped back into container 13. During machining a gas is emitted from the dielectric that is removed by a gas evacuating system 16 represented only symbolically. Machine head 23 into which workpiece 2 is fastened, is slideably mounted on spark erosion machine 11. Its displacements are carried out by electric drive motor 27 that receives its control signals from NC or CNC control plant 29. Tachogenerator 28 transmits the rotations of motor 27 to control plant 29 which also receives information as to the movements carried out by machine head 23 via linear scale 17 and measuring sensor 18 for Z-axis 21. In this Z-axis the advance and liftoff movements of workpiece 2 are carried out. Workpiece 2 may also move in the C-axis whose circular paths are represented by arrows 20. These movements are carried out by control plant 29 through electric drive motor 25. Tachogenerator 26 transmits the information about the rotations of motor 25 to control plant 29. Measuring system 24 transmits the movements of workpiece 2 in the C-axis also to control plant 29. Spark erosion generator 30 generates the ignition voltage, operational voltage, pulse wave shape, pulse duration, intermission between the pulses, pulsed current, necessary for the instantaneous machining, average current, and transmits the electric machining parameters through collector rings 22 to workpiece 2 and via machine bed 12 to electrode 1. The values of these machining parameters change constantly during machining of workpiece 2 by electrode 1. Furthermore the values of the pressure and the quantity of the dielectric liquid vary, too. Control plant 29 governs spark erosion generator 30 always in such a way that these parameters are optimally adapted to the remaining path to be covered during the entire machining process.

Control plant also controls the flushing system (not illustrated) so that the dielectric liquid is adapted optimally to the conditions prevailing in the working gap during the machining process whereby the remaining path to be covered is taken into consideration.

Figure 2:
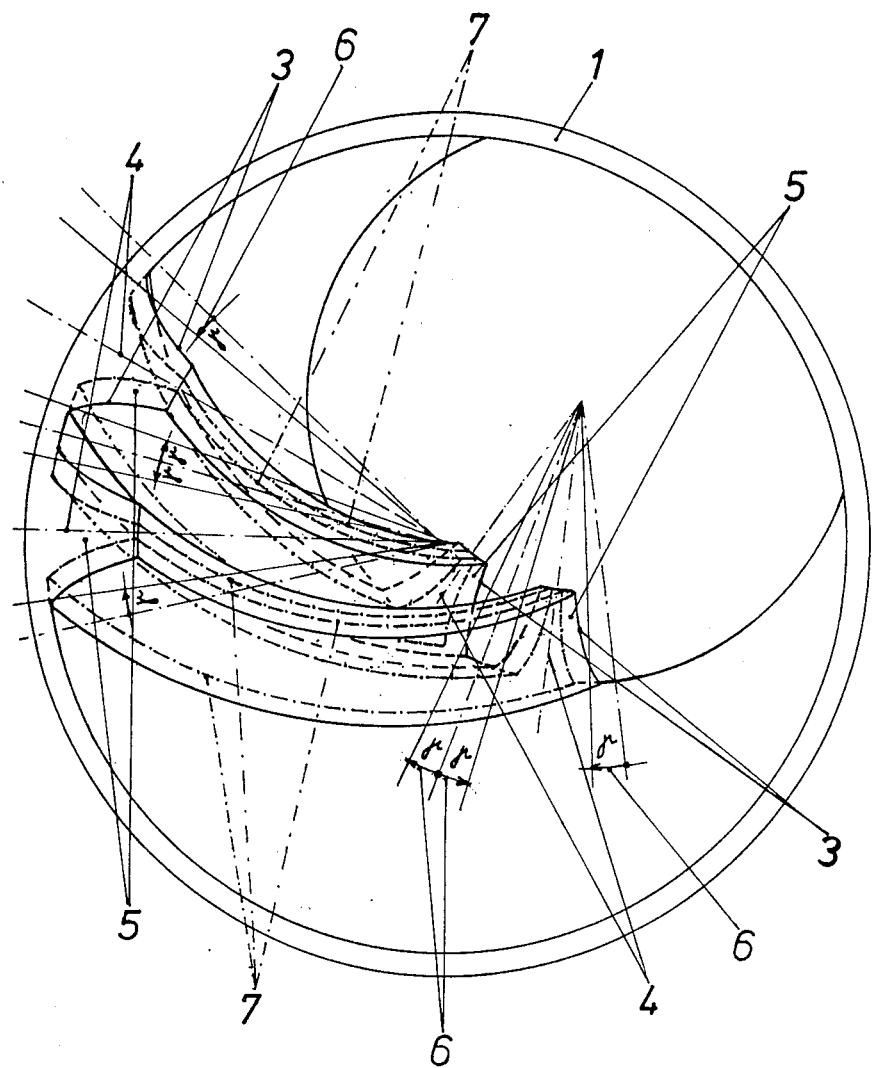
FIG. 2 represents, in the same scale, an electrode which possesses the exact negative form of the workpiece and on which according to the invention the turning-in of the negative tooth flanks towards the center of the negative tooth gap is indicated with dash-and-dotted lines
Figure 3:
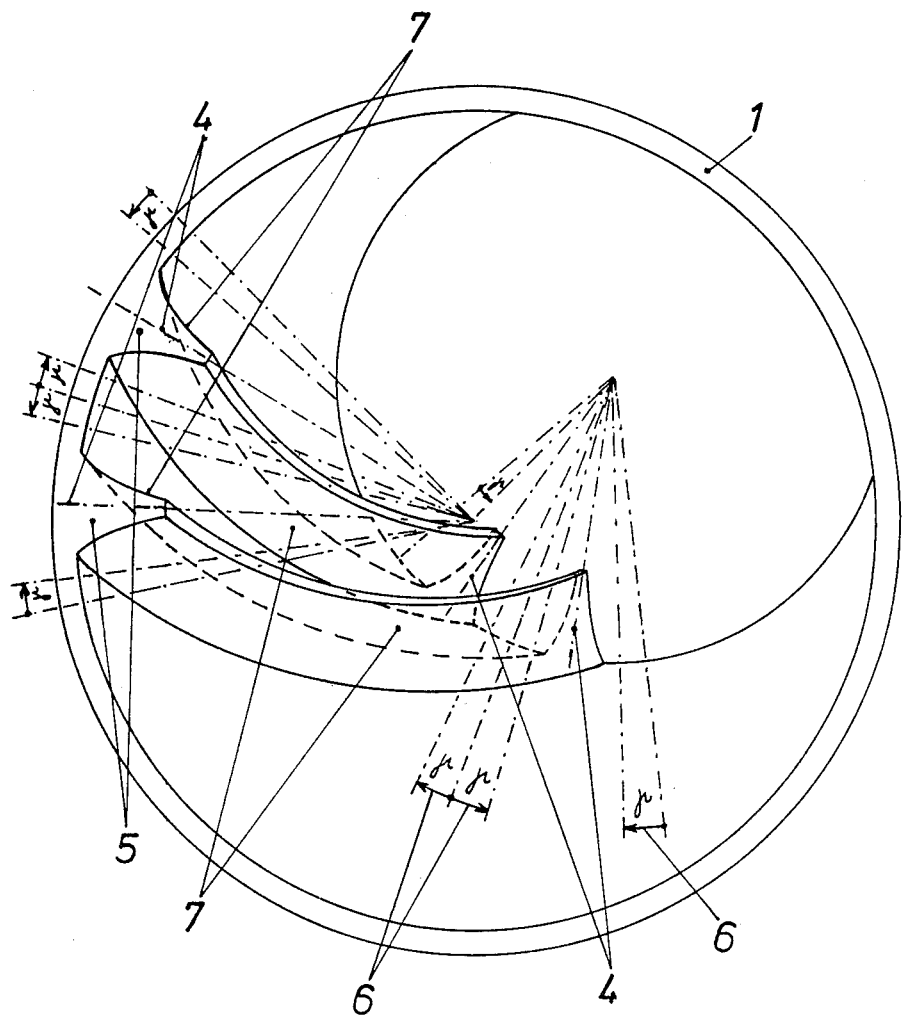
FIG. 3 illustrates, in the same scale, the inventive electrode with turned tooth flanks.

Workpiece 2 is advanced toward electrode 1 whereby the tooth flanks 8 are machined out of the full material. In FIG. 4 the workpiece 2 is shown finish-machined for better viewing. The movements in the Z- and C-axis are controlled in the manner as described in connection with FIGS. 1, 2 and 3.

I claim:

1. Process for spark erosion and/or electrochemcial machining of tapered gears with hypoid tooth profile out of a workpiece whereby the workpiece to be machined is immersed into an electrode of a machine operating on spark erosion or in an electrochemical manner, said electrode having a negative shape of the workpiece, comprising the steps of:
   (a) using an electrode having tooth flanks which are positioned towards a center of its negative tooth gaps by a selected angle which provides such gaps between the tooth flanks of the electrode and the to be finish-machined tooth flanks of the workpiece that during immersion removal of material of the to be finish-machined tooth flanks is avoided;
   (b) immersing the workpiece into the electrode in a first helical movement corresponding to a pitch curve of a segment;
   (c) conducting a second rotational movement relative to electrode and workpiece to finish the tooth flank on one side of the teeth;
   (d) conducting a third rotational movement in opposite direction to the second movement to finish the tooth flank on the other side of the teeth.

2. Process for spark erosion and/or electrochemical machining of tapered gears with hypoid tooth profile out of a workpiece whereby the workpiece to be machined is immersed into an electrode of a machine operating on spark erosion or in an electrochemical manner, said electrode having a negative shape of the workpiece, comprising the steps of:
   (a) using an electrode having tooth flanks which are positioed towards a center of its negative tooth gaps by a selected angle which provides such gaps between the tooth flanks of the electrode and the to be finish-machined tooth flanks of the workpiece that during immersion removal of material of the to be finish-machined tooth flanks is avoided;
   (b) immersing the workpiece into the electrode in a first helical movement corresponding to a pitch curve of a segment only to a predetermined depth at which the gap at a tooth tip and at a tooth base of the workpiece is diminished to such an extent that under rough working conditions material removal might also initiate on such locations;
   (c) conducting a second helical and rotational movement relative to electrode and workpiece to finish the tooth flank on one side of the teeth;
   (d) conducting a third helical and rotational movement back to a predetermined depth position;
   (e) conducting a forth helical and rotational movement in opposite direction to the second movement to finish the tooth flank on an other side of the teeth.

3. Process according to claim 2, wherein during all movements on the machine a spark erosion generator constantly adapts the ignition voltage, pulse wave shape, pulse duration, intermission between two pulses, pulse current, average current, operatioal tension as well as pressure and quantity of flushing liquid used during machining in dependency of a remaining path to be covered, said adaptation being carried out by means of a control plant of the machine.

4. Process according to claim 2, wherein during all movements on the machine a spark erosion generator constantly adapts the ignition voltage, pulse wave shape, pulse duration, intermission between two pulses, pulse current, average current, operational tension as well as pressure and quantity of flushing liquid used during machining in dependency of a remaining path to be covered, said adaptation being carried out by means of a control plant of the machine.

* * * * *